US009969943B2

United States Patent
Bennetzen et al.

(10) Patent No.: US 9,969,943 B2
(45) Date of Patent: May 15, 2018

(54) USE OF MAGNETIC NANOPARTICLES FOR DEPLETION OF AROMATIC COMPOUNDS IN OIL

(71) Applicant: MÆRSK OLIE OG GAS A/S, København K (DK)

(72) Inventors: Martin Vad Bennetzen, Copenhagen K (DK); Kristian Mogensen, Copenhagen K (DK)

(73) Assignee: MAERSK OLIE OG GAS A/S, Copenhagen K (DK)

( * ) Notice: Subject to any disclaimer, the term of this patent is extended or adjusted under 35 U.S.C. 154(b) by 0 days. days.

(21) Appl. No.: 15/033,521

(22) PCT Filed: Sep. 30, 2014

(86) PCT No.: PCT/EP2014/070904
§ 371 (c)(1),
(2) Date: Apr. 29, 2016

(87) PCT Pub. No.: WO2015/044449
PCT Pub. Date: Apr. 2, 2015

(65) Prior Publication Data
US 2016/0272898 A1 Sep. 22, 2016

(30) Foreign Application Priority Data
Sep. 30, 2013 (DK) .............................. 2013 70545

(51) Int. Cl.
*C10G 32/02* (2006.01)
*C10G 25/00* (2006.01)
*C10G 32/00* (2006.01)

(52) U.S. Cl.
CPC .......... *C10G 32/02* (2013.01); *C10G 25/003* (2013.01); *C01P 2004/64* (2013.01);
(Continued)

(58) Field of Classification Search
CPC ...... C10G 25/003; C10G 32/00; C10G 32/02; C10G 2300/302; C10G 2300/308; C01P 2004/64; C01P 2006/42
See application file for complete search history.

(56) References Cited

U.S. PATENT DOCUMENTS 3,300,375 A   1/1967   Clifford
3,970,518 A   7/1976   Giaever
(Continued)

FOREIGN PATENT DOCUMENTS

AU   2012101651 A4   12/2012
CN       1736881 A    2/2006
(Continued)

OTHER PUBLICATIONS

Bruce et al., "Synthesis, characterisation and application of silica-magnetite nanocomposites", Available online Aug. 2, 2004.
(Continued)

*Primary Examiner* — Brian A McCaig
(74) *Attorney, Agent, or Firm* — Brinks Gilson & Lione

(57) ABSTRACT

A method of treating crude oil comprising depleting the content of aromatic hydrocarbons comprising contacting the crude oil with super-paramagnetic or paramagnetic nanoparticles comprising chemical functional groups. The method increases the API gravity of crude oil and reduces the viscosity of said oil. Oil can be depleted in its content of sulphur-containing aromatics using functionalized nanoparticles.

23 Claims, 1 Drawing Sheet

(52) U.S. Cl.
CPC .... *C01P 2006/42* (2013.01); *C10G 2300/302* (2013.01); *C10G 2300/308* (2013.01)

(56) References Cited

U.S. PATENT DOCUMENTS

| | | | |
|---|---|---|---|
| 4,246,355 | A | 1/1981 | Bolto et al. |
| 4,247,398 | A | 1/1981 | Mohri |
| 4,279,756 | A | 7/1981 | Weiss et al. |
| 4,285,819 | A | 8/1981 | Yen et al. |
| 4,452,773 | A | 6/1984 | Molday |
| 4,476,027 | A | 10/1984 | Fox |
| 4,846,962 | A | 7/1989 | Yao |
| 5,230,805 | A | 7/1993 | Yates et al. |
| 5,397,476 | A | 3/1995 | Bradbury et al. |
| 5,405,531 | A | 4/1995 | Hitzman et al. |
| 5,753,180 | A | 5/1998 | Burger |
| 5,855,790 | A | 1/1999 | Bradbury et al. |
| 6,596,182 | B1 | 7/2003 | Prenger et al. |
| 6,669,849 | B1 | 12/2003 | Nguyen et al. |
| 7,169,618 | B2 | 1/2007 | Skold |
| 8,021,540 | B2 | 9/2011 | Toida |
| 8,636,906 | B2 | 1/2014 | Stein |
| 2003/0102255 | A1 | 6/2003 | Mahajan |
| 2004/0241428 | A1 | 12/2004 | Kohno |
| 2006/0037914 | A1 | 2/2006 | Niki et al. |
| 2007/0246426 | A1 | 10/2007 | Collins |
| 2009/0017518 | A1 | 1/2009 | Wu et al. |
| 2009/0050315 | A1 | 2/2009 | Fallon et al. |
| 2009/0120842 | A1 | 5/2009 | Koseoglu et al. |
| 2010/0051510 | A1 | 3/2010 | Lee |
| 2010/0051557 | A1 | 3/2010 | Etemad et al. |
| 2010/0059449 | A1 | 3/2010 | Grass et al. |
| 2010/0147647 | A1 | 6/2010 | Koseoglu et al. |
| 2011/0030967 | A1 | 2/2011 | Mcguire |
| 2011/0139687 | A1 | 6/2011 | Yeganeh et al. |
| 2011/0306525 | A1 | 12/2011 | Lighthelm |
| 2012/0103913 | A1 | 5/2012 | Kiyoto et al. |
| 2012/0145601 | A1 | 6/2012 | Lee |
| 2012/0145637 | A1 | 6/2012 | Alfadul et al. |
| 2013/0023448 | A1 | 1/2013 | Glasscott et al. |
| 2013/0134098 | A1 | 5/2013 | Kostedt et al. |
| 2013/0168097 | A1 | 7/2013 | Janssen et al. |
| 2013/0216833 | A1* | 8/2013 | Logli ............... B01D 53/508 428/402 |
| 2014/0131288 | A1 | 5/2014 | Gu et al. |
| 2015/0217288 | A1 | 8/2015 | Hutter et al. |

FOREIGN PATENT DOCUMENTS

| | | |
|---|---|---|
| CN | 102531116 | 7/2012 |
| CN | 102675537 A | 9/2012 |
| CN | 103084147 A | 5/2013 |
| DE | 4307262 A1 | 9/1994 |
| DE | 10160664 A1 | 6/2003 |
| DE | 102009035764 A1 | 2/2011 |
| EP | 0083202 A1 | 7/1983 |
| EP | 2244268 A1 | 10/2010 |
| EP | 2339343 A1 | 6/2011 |
| EP | 2349919 A2 | 8/2011 |
| GB | 2019378 A | 10/1979 |
| GB | 1583881 A | 2/1981 |
| WO | 9707064 A1 | 2/1997 |
| WO | 2008055371 A2 | 5/2008 |
| WO | 2010062586 A2 | 6/2010 |

OTHER PUBLICATIONS

International Search Report and Written Opinion for PCT/EP2014/070904, dated Jan. 1, 2015.
International Preliminary Report on Patentability for PCT/EP2014/070904, dated Apr. 5, 2016.
International-type Search Report for Danish Application No. PA 2013 70545, Completed Jan. 28, 2014.
Office Action for Danish Application No. PA 2013 70545, Completed May 12, 2014.
Arthur et al., Technical Summary of Oil Produced Water Treatment Technologies, Mar. 2005, pp. 1-60 (Year/ 2005).
Urban et al., "Functionalized paramagnetic nanoparticles for waste water treatment", published May 25, 2010.
Igunna et al., Produced Water Treatment Technologies, Apr. 30, 2012 (Year/ 2012).
Dejak, The Next Generation Water Filter for the Oil and Gas Industry, Young Technology Showcase, Oct. 2013 (Year/ 2013).
Old Oil Field Waterplood Operations and Enhanced Oil Recovery Potential, vol. 2, Chapter 12, p. 1-56, no date (Year/ 0).

\* cited by examiner

Step 1: Incubation of nanoparticles in crude oil
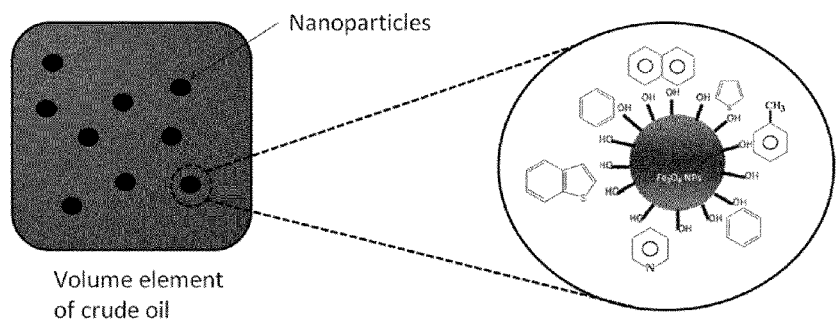
Volume element of crude oil
Step 2: Removal of nanoparticles from produced oil
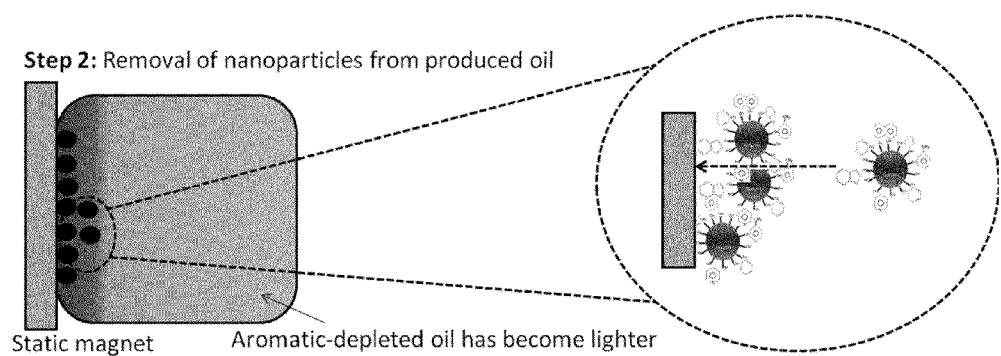
Static magnet    Aromatic-depleted oil has become lighter

USE OF MAGNETIC NANOPARTICLES FOR DEPLETION OF AROMATIC COMPOUNDS IN OIL

RELATED APPLICATIONS

This application claims the benefit under 35 U.S.C. § 371 of the filing date of International Patent Application No. PCT/EP2014/070904, having an international filing date of Sep. 30, 2014, which claims priority to Danish Application No. PA 2013 70545, filed Sep. 30, 2013, the contents of both of which are incorporated herein by reference in their entirety.

FIELD OF INVENTION

The method of the invention is directed to using super paramagnetic or paramagnetic nanoparticles for the depletion of aromatic compounds from crude oil.

BACKGROUND OF THE INVENTION

Crude oil produced from subsurface reservoirs is a mixture of a number of different hydrocarbons; the most commonly found molecules are alkanes, cycloalkanes, aromatic hydrocarbons, or more complicated chemicals like asphaltenes. Each type of crude oil has a unique mix of molecules influencing the physical and chemical properties, like density and viscosity.

The alkanes, also known as paraffins, are saturated hydrocarbons with straight or branched chains which contain only carbon and hydrogen. Alkanes generally contain up to 50 carbon atoms. The cycloalkanes, also known as naphthenes, are saturated hydrocarbons which have one or more carbon rings. Cycloalkanes have similar properties to alkanes but have higher boiling points.

The aromatic hydrocarbons are unsaturated hydrocarbons which have one or more planar six-carbon rings called benzene rings containing six delocalized π-electrons. Aromatic compounds in crude oil are undesirable because of soot production during combustion and tend to burn with a sooty flame.

Moreover, sulphur is often incorporated in large aromatic molecules. Sulphur lowers the quality, and hence economic value, of crude oil because it leads to environmental problems and requires major refining to meet sulphur standards imposed on fuels in consuming countries.

The petroleum industry generally classifies crude oil by the geographic location it is produced in, its API gravity and its sulphur content. Crude oil is considered light if it has low density or heavy if it has high density, and it is referred to as sweet if it contains relatively little sulphur or sour if it contains higher amounts of sulphur.

Light crude oil is more desirable than heavy oil since it produces a higher yield of petrol, while sweet oil commands a higher price than sour oil because it has fewer environmental problems and requires less refining to meet sulphur standards imposed on fuels in consuming countries.

Aromatic molecules can exist in complex structures containing many rings and the non-bonding (called π-π stacking) interaction between these rings is strong and so pure compounds of even a few rings are solid at room temperature where the equivalent (in terms of number of carbon atoms) normal paraffin is a viscous liquid under the same conditions. Thus the greater the amount of aromatics in crude oil, the higher crude oil viscosity which is undesirable for the transport of the oil.

It is the ratio of these compound types (aromatics, paraffins and naphthenes) that impacts the quality, density, sourness and viscosity of the crude.

Moreover, from a health perspective, aromatic compounds are often carcinogenic so clearly aromatic compounds are also in this respect undesirable in crude oil.

In summary, aromatic compounds in crude oil
a) lower the quality of crude oil
b) lead to increased viscosity, lower mobility during oil transport
c) lead to sooty smoke and hence air pollution with negative impact on the environment
d) are carcinogenic and cause health problems and potential onset of cancers when in contact with human skin, lungs (when inhaled in the gas phase) etc.
e) often contain incorporated sulphur atoms in polycyclic aromatic hydrocarbons molecules
f) lead to higher refinery costs to remove the aromatics and polycyclic aromatics hydrocarbons (containing e.g. sulphur) from the crude oil These molecules can be removed from the crude oil in upstream refining processes typically involving boiling point distillation. Aromatic hydrocarbons, heteroatomic aromatic compounds and polynuclear aromatic compounds are typically removed by phase transitive processes.

US 20090050315 discloses the reduction of the viscosity of crude oil through reductive biotransformation of aromatic components of the crude oil by enhancing the biochemical capabilities of the natural anaerobic microbial populations of the well. The method comprises providing injection water containing anaerobic microbial populations capable of reducing aromatic hydrocarbons.

Processes have been disclosed employing solid adsorbent materials for use in treating hydrocarbon feed streams to remove undesired compounds, including nitrogen and sulfur-containing compounds. For example, U.S. Pat. No. 4,846,962 discloses a process for selectively removing basic nitrogen compounds from solvent extracted oils by their absorption to a solid acidic polar-absorbent material. Following the solvent extraction process, the basic nitrogen compounds present with the desired oil fraction are contacted with adsorbents of the silica-alumina type, Ketjen high-alumina base (amorphous) and H-Y zeolite (crystalline) identified as being preferred. In addition, various treatments were applied to the adsorbents to improve their effectiveness. It was also disclosed that the adsorbents could be regenerated, e.g., by purging with a hot hydrogen gas stream.

US 20100147647 and US20090120842 disclose a treatment of crude oil feed stream to reduce the content of heteroatomic and polynuclear aromatic compounds containing nitrogen and sulfur by contacting the feed stream with one or more solid absorbent materials selected from attapulgus clay, alumina, silica gel and activated carbon in a mixing vessel to optimize the absorption of the undesired compounds, followed by subjecting the mixture to atmospheric flash distillation and vacuum flash distillation to recover presorbed boiling ranges of products having a lowered content of the undesired compounds.

U.S. Pat. No. 8,021,540 describes a method of desulfurizing a hydrocarbon oil, such as kerosene or gas oil by which sulfur compounds are diminished. The method comprises bringing a hydrocarbon oil containing thiophene compounds, benzothiophene compounds, dibenzothiophene compounds or aromatic hydrocarbons into contact with a solid acid catalyst and/or an activated carbon having a transition metal oxide supported thereon to thereby desulfurize the oil. The solid acid catalyst preferably is a solid ultrastrong-acid catalyst selected among sulfuric acid radical/zirconia, sulfuric acid radical/alumina, sulfuric acid radical/tin oxide, sulfuric acid radical/iron oxide, tungstic acid/zirconia, and tungstic acid/tin oxide.

There is general consensus that the average crude oil quality is trending down. The average API gravity and sulfur content of aggregate refinery crude slates varies by region; some regions process lighter, sweeter crude slates than others. However, over time, the average quality of the global crude slate has been declining gradually. Average API gravity has been decreasing. Average sulfur content has been increasing more rapidly, a trend likely to continue for the foreseeable future. Thus, aromatic compounds are highly undesirable constituents of crude oil. There is therefore a need in the industry for methods to remove these molecules from the crude oil in upstream refining processes.

SUMMARY OF THE INVENTION

A first aspect of the invention is directed to a method of treating crude oil comprising depleting the content of compounds selected from the group consisting of aromatic hydrocarbons and heteroatomic aromatic compounds and polynuclear aromatic compounds in said crude oil, said method comprising i) contacting the crude oil with super-paramagnetic or paramagnetic nanoparticles comprising a core of super-paramagnetic or paramagnetic optionally coated with an inorganic or organic compound, or comprising a composite core of a super-paramagnetic or paramagnetic material, which nanoparticles comprises chemical functional groups either originating from the paramagnetic core or from a coating surrounding the core.

A second aspect of the invention is directed to a method of increasing the API gravity of crude oil and reducing the viscosity of said oil, comprising depleting the content of compounds selected from the group consisting of aromatic hydrocarbons and heteroatomic aromatic compounds and polynuclear aromatic compounds in said crude oil, said method comprising i) contacting the crude oil with super-paramagnetic or paramagnetic nanoparticles comprising chemical functional groups.

A third aspect of the invention is directed to a method of producing oil or other organic fuels that contains less sulphur-containing aromatics comprising depleting the content of compounds selected from the group consisting of aromatic hydrocarbons and heteroatomic aromatic compounds and polynuclear aromatic compounds in said crude oil, said method comprising i) contacting the crude oil with super-paramagnetic or paramagnetic nanoparticles comprising chemical functional groups.

According to any embodiment of the first aspect, the method comprises the following step:
i) Contacting the crude oil with super-paramagnetic or paramagnetic nanoparticles comprising chemical functional groups,
ii) Complexing at least a portion of the compounds selected from the group consisting of aromatic hydrocarbons and heteroatomic aromatic compounds and polynuclear aromatic compounds in said crude oil with the nanoparticle so as to form an aromatic compound-nanoparticle complex;
iii) Removing the aromatic compound-nanoparticle complex from the crude oil by applying a magnetic field so as to provide a crude oil with a depleted aromatic content.

According to any embodiment of the first aspect, the diameter of the superparamagnetic or paramagnetic particles is between 1 nm to 10 µm, preferably in the range of 1 to 1000 nm.

According to any embodiment of the first aspect, the particle size of the nanoparticles is in the range of 1 to 500 nm, such as in the range of 3 to 500 nm, preferably in the range of 5 to 300 nm, such as in the range of 7.5 to 200 nm, typically in the range of 10 to 250 nm, more preferably in the range of 10 to 100 nm.

According to any embodiment of the first aspect, the invention relates to a method for depleting the crude oil in at least one of benzene, xylene, toluene, phenols; polycyclic aromatic hydrocarbons (PAHs), including naphthalene and 1,2-benzopyren; heteroatomic aromatics comprising nitrogen, sulfur and/or oxygen as a heteroatom in the ring structure, including thiophenes, benzothiophenes, and dibenzothiophenes; and asphaltene According to any embodiment of the first aspect, the chemical functional groups is selected from the group consisting of carboxy (e.g., carboxylic acid groups), epoxy, ether, ketone, amine, hydroxy, alkoxy, alkyl, aryl, aralkyl, alkaryl, lactone, ionic groups such as ammonium groups and/or carboxylate salt groups, polymeric or oligomeric groups or a combination comprising at least one of the forgoing functional groups, preferably a hydroxy, a carboxylic acid, a carboxylate ion or salt, an amine or ammonium ion or salt.

According to any embodiment of the first aspect, the superparamagnetic or paramagnetic nanoparticles have a core of super-paramagnetic or paramagnetic being at least partially coated with an organic compound or an inorganic compound. The organic compound is selected from the group consisting of an antibody, a peptide of 2-200 amino acids, an amino acid, a polysaccharide, a sugar, a nucleotide or nucleoside including DNA or RNA, a $C_1$-$C_{30}$ alkyl, a $C_1$-$C_{30}$ alkenyl, a $C_1$-$C_{30}$ alkylyl, a $C_1$-$C_{30}$ ether, a $C_1$-$C_{30}$ amine, a $C_1$-$C_{30}$ ester, a $C_1$-$C_{30}$ amide, and combinations thereof. Alternatively, the organic compound terminates with a group selected from the group consisting of a hydroxy, alkoxy, carboxylic acid, carboxylate ion or salt, and amine or ammonium salt.

According to any embodiment of the first aspect, the particle is at least partially coated with organic compound is selected from the group consisting of acrylic polymeric chains having carboxylic acid functional groups, hydroxy functional groups, and/or amine functional groups; polyamines such as polyethylene amine or polyethylene imine; poly(alkylene glycols) such as poly(ethylene glycol) and poly(propylene glycol), and polysaccharide chains.

According to any embodiment of the first aspect, the chemical functional group is at least partially further functionalized with an inorganic or organic compound so as to provide a combination of functional groups. The combination of chemical functional groups can be located on compounds selected from the group consisting of an antibody, a peptide of 2-200 amino acids, an amino acid, a polysaccharide, a sugar, a nucleotide or nucleoside including DNA or RNA, a $C_1$-$C_{30}$ alkyl, a $C_1$-$C_{30}$ alkenyl, a $C_1$-$C_{30}$ alkylyl, a $C_1$-$C_{30}$ ether, a $C_1$-$C_{30}$ amine, a $C_1$-$C_{30}$ ester, a $C_1$-$C_{30}$ amide, and combinations thereof.

According to any embodiment of the first aspect, the organic compound is selected from the group consisting of a polymer, such as a polysaccharide, an alginate, a chitosan, a PEG, a dextran or a polyethylene amine; and an organic acid.

According to any embodiment of the first aspect, the superparamagnetic or paramagnetic nanoparticles are superparamagnetic or paramagnetic nanoparticles functionalised with a hydroxyl moiety.

According to any embodiment of the first aspect, the super-paramagnetic or paramagnetic nanoparticles are made from iron, gold, silver, palladium, nickel or cobalt, or alloys thereof.

According to any embodiment of the first aspect, the superparamagnetic or paramagnetic nanoparticles are magnetite ($Fe_3O_4$) nanoparticles.

According to a further aspect the invention relates to a composition comprising crude oil and super-paramagnetic nanoparticles, said nanoparticles optionally comprising chemical functional groups.

According to yet a further aspect the invention relates to an oil with depleted sulphur content obtainable by a method according to any embodiment of the first, second and third aspects.

According to yet a further aspect the invention relates to a low viscosity oil obtainable by a method according to any embodiment of the first, second and third aspects.

According to yet a further aspect the invention relates to an oil with depleted content of aromatic compounds, such as any one of at least aromatic hydrocarbons and heteroatomic aromatic compounds and polynuclear aromatic compounds, obtainable by a method according to any embodiment of the first, second and third aspects.

According to yet a further aspect the invention relates to a crude oil fraction obtainable by a method according to any embodiment of the first, second and third aspects.

According to yet a further aspect, the invention relates to use of paramagnetic or super-paramagnetic nano-particles for removing aromatic hydrocarbons, heteroatomic aromatic compounds and/or polynuclear aromatic compounds from crude oil.

According to yet a further aspect, the invention relates to use of paramagnetic or super-paramagnetic nano-particles for providing an oil having a reduced amount/concentration of sulphur-containing aromatics.

BRIEF DESCRIPTION OF THE FIGURES

FIG. 1 depicts an embodiment of the method of the invention wherein in a first step the superparamagnetic or paramagnetic particles are incubated with crude oil. The preferred nanoparticles are hydroxylated nanoparticles such as magnetite ($Fe_3O_4$) nanoparticles. The particles non-covalently bind to aromatic compounds in the oil. The particles are removed by applying a static magnetic force to the nanoparticle-containing oil so as to produce oil with a depleted content of aromatic compounds.

DETAILED DESCRIPTION OF THE INVENTION

The present invention departs from phase transitive methods of removal of aromatic hydrocarbons, heteroatomic aromatic compounds and polynuclear aromatic compounds by instead utilizing a novel physi-absorptive method comprising the use of super-paramagnetic nanoparticles comprising chemical functional groups. The present invention departs from other absorptive methods by being selective for aromatic compounds rather than for compounds containing nitrogen or sulfur.

The term "aromatic" refers to a chemical compound that contains a closed loop of electrons in a ring, most commonly a closed loop of six electrons, having the feature of being diatropic. The term aromatic hydrocarbon is intended to mean simple aromatic compounds such benzene, xylene, toluene . . . to polycyclic aromatic hydrocarbons (PAHs) from naphthalene and 1,2-benzopyrene and their derivatives to asphaltene.

The terms heteroatomic aromatic compounds and polynuclear aromatic compounds are intended to mean aromatic compounds comprising a nitrogen, sulfur and/or oxygen heteroatom in ring structure. Examples include thiophene compounds, benzothiophene compounds, and dibenzothiophene.

Thiophenes are heterocyclic sulfur compounds containing one or more sulfur atoms as a heteroatom, in which the hetero ring is a five-membered or six-membered ring having aromaticity (two or more double bonds) and not condensed with a benzene ring, and derivatives thereof. Thiophenes include a compound having a structure in which hetero rings condensed among themselves. Thiophene, which is also referred to as thiofuran, is a sulfur compound having a molecular formula of $C_4H_4S$. Examples of other typical thiophenes include methylthiophene (thiotolene), thiapyran (penthiophene), thiophthene, tetraphenylthiophene (thionessal), dithienylmethane, and derivatives of these compounds.

Benzothiophenes are heterocyclic sulfur compounds containing one or more sulfur atoms as a heteroatom, in which the hetero ring is a five-membered or six-membered ring having aromaticity (two or more double bonds) and condensed with one benzene ring, and derivatives thereof. Benzothiophene is also referred to as thionaphthene or thiocoumarone. As examples of other typical benzothiophenes, alkylbenzothiophenes such as methylbenzothiophene, dimethylbenzothiophene, trimethylbenzothiophene, tetramethylbenzothiophene, pentamethylbenzothiophene, hexamethylbenzothiophene, methylethylbenzothiophene, dimethylethylbenzothiophene, trimethylethylbenzothiophene, tetramethylethylbenzothiophene, pentamethylethylbenzothiophene, methyldiethylbenzothiophene, dimethyldiethylbenzothiophene, trimethyldiethylbenzothiophene, tetramethyldiethylbenzothiophene, methylpropylbenzothiophene, dimethylpropylbenzothiophene, trimethylpropylbenzothiophene, tetramethylpropylbenzothiophene, pentamethylpropylbenzothiophene, methylethylpropylbenzothiophene, dimethylethylpropylbenzothiophene, trimethylethylpropylbenzothiophene, and tetramethylethylpropylbenzothiophene; thiachromene, dithianaphthalene, and derivatives of these compounds.

Dibenzothiophenes are heterocyclic sulfur compounds containing one or more sulfur atoms as a heteroatom, in which the hetero ring is a five-membered or six-membered ring having aromaticity (two or more double bonds) and condensed with two benzene rings, and derivatives thereof. Dibenzothiophene is also referred to as diphenylene sulfide or biphenylene sulfide. 4-methyldibenzothiophene and 4,6-dimethyldibenzothiophene are well known as difficultly desulfurized compounds in the art of hydro-refining. As examples of other typical dibenzothiophenes, alkyldibenzothiophenes such as trimethyldibenzothiophene, tetramethyldibenzothiophene, pentamethyldibenzothiophene, hexamethyldibenzothiophene, heptamethyldibenzothiophene, octamethyldibenzothiophene, methylethyldibenzothiophene, dimethylethyldibenzothiophene, trimethylethyldibenzothiophene, tetramethylethyldibenzothiophene, pentamethylethyldibenzothiophene, hexamethylethyldibenzothiophene, heptamethylethyldibenzothiophene, methyldiethyldibenzothiophene, dimethyldiethyldibenzothiophene, trimethyldiethyldibenzothiophene, tetramethyldiethyldibenzothiophene, pentamethyldiethyldibenzothiophene, hexamethyldiethyldibenzothiophene, heptamethyldiethyldibenzothiophene, methylpropyldibenzothiophene, dimethylpropyldibenzothiophene, trimethylpropyldibenzothiophene, tetramethylpropyldibenzothiophene, pentamethylpropyldibenzothiophene, hexamethylpropyldibenzothiophene, heptamethylpropyldibenzothiophene, methylethylpropyldibenzothiophene, dimethylethylpropyldibenzothiophene, trimethylethylpropyldibenzothiophene, tetramethylethylpropyldibenzothiophene, pentamethylethylpropyldibenzothiophene, and hexamethylethylpropyldibenzothiophene; thianthrene (diphenylene disulfide), thioxanthene (dibenzothiopyran or diphenylmethane sulfide), and derivatives of these compounds are given.

As stated, there is a need for methods to remove aromatic hydrocarbons and heteroatomic aromatic compounds and polynuclear aromatic compounds from the crude oil in upstream refining processes as alternatives to boiling point distillation methods. The invention is directed to a crude oil fraction obtainable by a method described herein.

The invention is directed to a method of producing oil that contains less aromatic compounds, particularly sulphur-containing aromatics, the method comprising depleting the content of compounds selected from the group consisting of aromatic hydrocarbons and heteroatomic aromatic compounds and polynuclear aromatic compounds in said crude oil, said method comprising i) contacting the crude oil with super-paramagnetic or paramagnetic nanoparticles comprising chemical functional groups.

More generally, the invention is directed to a method of treating crude oil comprising depleting the content of compounds selected from the group consisting of aromatic hydrocarbons and heteroatomic aromatic compounds and polynuclear aromatic compounds in said crude oil, said method comprising i) contacting the crude oil with super-paramagnetic or paramagnetic nanoparticles comprising chemical functional groups.

A technical aspect of the invention is directed to a method of increasing the API gravity of crude oil and reducing the viscosity of said oil, comprising depleting the content of compounds selected from the group consisting of aromatic hydrocarbons and heteroatomic aromatic compounds and polynuclear aromatic compounds in said crude oil, said method comprising i) contacting the crude oil with super-paramagnetic or paramagnetic nanoparticles comprising chemical functional groups.

The method of the invention typically involves the following steps:
i) Contacting the crude oil with super-paramagnetic or paramagnetic nanoparticles comprising chemical functional groups,
ii) Complexing at least a portion of the compounds selected from the group consisting of aromatic hydrocarbons and heteroatomic aromatic compounds and polynuclear aromatic compounds in said crude oil with the nanoparticle so as to form an aromatic compound-nanoparticle complex;
iii) Removing the aromatic compound-nanoparticle complex from the crude oil by applying a magnetic field so as to provide a crude oil with a depleted aromatic content.

The method of the invention provides for oil with depleted sulfur content and/or depleted content of aromatic compounds and/or with a reduced viscosity.

The method involves depleting the content of aromatic compounds selected from the group consisting of aromatic hydrocarbons and heteroatomic aromatic compounds and polynuclear aromatic compounds in oil, particularly crude oil. Typically, the purpose of the method is to remove, deplete or reduce the content of at least one type of aromatic compound selected from the group consisting of benzene, xylene, toluene, phenols; polycyclic aromatic hydrocarbons (PAHs), including naphthalene and 1,2-benzopyren; heteroatomic aromatics comprising nitrogen, sulfur and/or oxygen as a heteroatom in the ring structure, including thiophenes, benzothiophenes, and dibenzothiophenes; and asphaltene from oil.

The method involves the use of super-paramagnetic or paramagnetic nanoparticles comprising chemical functional groups. The particles are paramagnetic in nature in that they are attracted to a magnet when placed in a magnetic field but retain no magnetic memory upon removal of the magnetic field. This characteristic prevents aggregation and allows paramagnetic properties. The magnetism of the paramagnetic particle may be useful for easy dispersion of the particles. Paramagnetic materials include most chemical elements and some compounds, they have a relative magnetic permeability greater or equal to 1 (i.e., a positive magnetic susceptibility) and hence are attracted to magnetic fields. The particles are of a chemical nature so as to have achieved by any number of elements or compounds. The particle may be superparamagnetic or paramagnetic due to the use of an organic superparamagnetic or paramagnetic compound, a metallic superparamagnetic or paramagnetic compound or an organometallic superparamagnetic or paramagnetic compound.

The magnetism of either a superparamagnetic or paramagnetic particle may be due to the particles comprising an element selected from the group consisting of lithium, oxygen, sodium, magnesium, aluminum, calcium, titanium, manganese, iron, cobalt, nickel, strontium, zirconium, molybdenum, ruthenium, rhodium, palladium, tin, barium, cerium, neodymium, samarium, europium, gadolinium, terbium, dysprosium, holmium, erbium, thulium, osmium, tungsten, tungsten iridium, tungsten and platinum. Strong magnetism of paramagnetic particles is exhibited by compounds containing iron, palladium, platinum, and the rare-earth elements. Accordingly, the particles preferably comprise an element selected from the group consisting of iron, palladium, platinum, and the rare-earth elements.

The particles may comprise a superparamagnetic or paramagnetic core, optionally coated with an inorganic or organic compound; or may comprise a composite core of a paramagnetic and a non-paramagnetic compound. The superparamagnetic or paramagnetic particles may be at least partially coated with an organic compound or an inorganic compound. Polymers are suitable non-paramagnetic compounds. Examples of polymers for use in a composite core include styrenic polymers or copolymers, (meth)acrylate polymers or copolymers, or a highly conjugated aromatic polymer.

As stated, the chemical functional group of the particle may be either from the particle (from the particle core composition itself) or from a coating around the particle. The chemical functional group may be selected from the group consisting of carboxy (e.g., carboxylic acid groups), epoxy, ether, ketone, amine, hydroxy, alkoxy, alkyl, aryl, aralkyl, alkaryl, lactone, ionic groups such as ammonium groups and/or carboxylate salt groups, polymeric or oligomeric groups or a combination comprising at least one of the forgoing functional groups, preferably a hydroxy, a carboxylic acid, a carboxylate ion or salt, an amine or ammonium ion or salt.

In some embodiments, the superparamagnetic or paramagnetic particles are at least partially coated with an organic compound or an inorganic compound. Alternatively, the chemical functional group may be located on the core composition of the particle comprising an iron-, gold-, silver-, palladium-, nickel-, cobalt-based core, or alloys thereof, comprising a chemical functional group, such as a hydroxy (—OH) moiety. In a preferred embodiment, the super-paramagnetic or paramagnetic nanoparticles are magnetite ($Fe_3O_4$) nanoparticles comprising hydroxyl group as the chemical functional group. Without being bound to a particular theory, it is envisaged that it is the area-to-volume-ratio dependent surface energy and the delocalised π-electron cloud interacting with the hydroxylated surface that lead to accumulation of aromatics. Accordingly, a preferred embodiment comprises hydroxylated magnetite ($Fe_3O_4$) nanoparticles of 10 to 100 nm.

The chemical functional group may alternatively be either from the particle or from a coating around the particle. The superparamagnetic or paramagnetic particles may be at least partially coated with an organic compound or an inorganic compound. The particles may comprise a superparamagnetic or paramagnetic core and may be coated with an inorganic or organic compound. The chemical functional group may be located on the inorganic or organic coating. Accordingly, the particles may comprise a superparamagnetic or paramagnetic particle further comprising a coating comprising an inorganic or organic compound or polymer, wherein said coating comprises the chemical functional group. The organic or inorganic compound may be a polymer or coating of molecules to at least partially cover the particle.

Nanoparticles at least partially coated with an inorganic compound, such as silica, nanoparticles are further embodiments of the method of the invention.

The organic compound may be selected from the group consisting of an antibody, a peptide of 2-200 amino acids, an amino acid, a polysaccharide, a sugar, a nucleotide or nucleoside including DNA or RNA, a $C_1$-$C_{30}$ alkyl, a $C_1$-$C_{30}$ alkenyl, a $C_1$-$C_{30}$ alkylyl, a $C_1$-$C_{30}$ ether, a $C_1$-$C_{30}$ amine, a $C_1$-$C_{30}$ ester, a $C_1$-$C_{30}$ amide, and combinations thereof, terminating with a group selected from the group consisting of a hydroxy, alkoxy, carboxylic acid, carboxylate ion or salt, amine or ammonium salt. Suitably, the coating is selected from the group consisting of a polysaccharide, an alginate, a chitosan, a PEG, a dextran, a polyethylene amine, and an organic acid. In a suitable embodiment, the particle is at least partially coated with organic compound selected from the group consisting of polymer chains such as acrylic chains having carboxylic acid functional groups, hydroxy functional groups, and/or amine functional groups; polyamines such as polyethylene amine or polyethylene imine; poly(alkylene glycols) such as poly(ethylene glycol) and poly(propylene glycol), and polysaccharide chains.

The superparamagnetic or paramagnetic particles may have a chemical functional group which is then functionalized with an inorganic or organic compound so as to provide a combination of functional groups. The combination of chemical functional groups may be located on compounds selected from the group consisting of an antibody, a peptide of 2-200 amino acids, an amino acid, a polysaccharide, a sugar, a nucleotide or nucleoside including DNA or RNA, a $C_1$-$C_{30}$ alkyl, a $C_1$-$C_{30}$ alkenyl, a $C_1$-$C_{30}$ alkylyl, a $C_1$-$C_{30}$ ether, a $C_1$-$C_{30}$ amine, a $C_1$-$C_{30}$ ester, a $C_1$-$C_{30}$ amide, and combinations thereof. The compounds may terminate with the chemical functional groups or may comprise the chemical functional groups anywhere along their structure. Typically, the compounds comprise at least one functional group selected from the group consisting of a hydroxy, alkoxy, carboxylic acid, carboxylate ion or salt, amine or ammonium salt.

The diameter of the superparamagnetic or paramagnetic particles is typically between 1 nm-10 μm, preferably in the range of 1-1000 nm. Alternatively stated, the particle size of the nanoparticles is in the range of 1-500 nm, such as in the range of 3-500 nm, preferably in the range of 5-300 nm, such as in the range of 7.5-200 nm, typically in the range of 10-250 nm, more preferably in the range of 10-100 nm.

According to a first aspect the invention is directed to a method of treating crude oil comprising depleting the content of compounds selected from the group consisting of aromatic hydrocarbons and heteroatomic aromatic compounds and polynuclear aromatic compounds in said crude oil, said method comprising i) contacting the crude oil with super-paramagnetic or paramagnetic nanoparticles comprising chemical functional groups.

According to a second aspect the invention is directed to a method of increasing the API gravity of crude oil and reducing the viscosity of said oil, comprising depleting the content of compounds selected from the group consisting of aromatic hydrocarbons and heteroatomic aromatic compounds and polynuclear aromatic compounds in said crude oil, said method comprising i) contacting the crude oil with super-paramagnetic or paramagnetic nanoparticles comprising chemical functional groups.

According to a third aspect the invention is directed to a method for producing oil or other organic fuels that contains less sulphur-containing aromatics comprising depleting the content of compounds selected from the group consisting of aromatic hydrocarbons and heteroatomic aromatic compounds and polynuclear aromatic compounds in said crude oil, said method comprising i) contacting the crude oil with super-paramagnetic or paramagnetic nanoparticles comprising chemical functional groups.

According to an embodiment of the first or the second aspect, the oil or organic fuel product obtained is depleted in sulphur containing aromatics.

According to an embodiment of any of the above aspects, the method can comprise the following steps:
iv) Contacting the crude oil with super-paramagnetic or paramagnetic nanoparticles comprising chemical functional groups,
v) Complexing at least a portion of the compounds selected from the group consisting of aromatic hydrocarbons and heteroatomic aromatic compounds and polynuclear aromatic compounds in said crude oil with the nanoparticle so as to form an aromatic compound-nanoparticle complex;
vi) Removing the aromatic compound-nanoparticle complex from the crude oil by applying a magnetic field so as to provide a crude oil with a depleted aromatic content.

According to an embodiment of any of the above aspects, the method the diameter of the superparamagnetic or paramagnetic particles is between 1 nm to 10 μm, preferably in the range of 1 to 1000 nm.

According to an embodiment of any of the above aspects, the particle size of the nanoparticles is in the range of 1 to 500 nm, such as in the range of 3 to 500 nm, preferably in the range of 5 to 300 nm, such as in the range of 7.5 to 200 nm, typically in the range of 10 to 250 nm, more preferably in the range of 10 to 100 nm.

According to an embodiment of any of the above aspects, the method relates to a method for depleting the crude oil in at least one of benzene, xylene, toluene, phenols; polycyclic aromatic hydrocarbons (PAHs), including naphthalene and 1,2-benzopyren; heteroatomic aromatics comprising nitrogen, sulfur and/or oxygen as a heteroatom in the ring structure, including thiophenes, benzothiophenes, and dibenzothiophenes; and asphaltene According to an embodiment of any of the above aspects, the chemical functional groups are either from the particle or from a coating around the particle.

According to an embodiment of any of the above aspects, the chemical functional groups is selected from the group consisting of carboxy (e.g., carboxylic acid groups), epoxy, ether, ketone, amine, hydroxy, alkoxy, alkyl, aryl, aralkyl, alkaryl, lactone, ionic groups such as ammonium groups and/or carboxylate salt groups, polymeric or oligomeric groups or a combination comprising at least one of the forgoing functional groups, preferably a hydroxy, a carboxylic acid, a carboxylate ion or salt, an amine or ammonium ion or salt.

According to an embodiment of any of the above aspects, the superparamagnetic or paramagnetic particles are at least partially coated with an organic compound or an inorganic compound. The organic compound can be selected from the group consisting of an antibody, a peptide of 2-200 amino acids, an amino acid, a polysaccharide, a sugar, a nucleotide or nucleoside including DNA or RNA, a $C_1$-$C_{30}$ alkyl, a $C_1$-$C_{30}$ alkenyl, a $C_1$-$C_{30}$ alkylyl, a $C_1$-$C_{30}$ ether, a $C_1$-$C_{30}$ amine, a $C_1$-$C_{30}$ ester, a $C_1$-$C_{30}$ amide, and combinations thereof. The organic compound might terminate with a group selected from the group consisting of a hydroxy, alkoxy, carboxylic acid, carboxylate ion or salt, and amine or ammonium salt.

According to an embodiment of any of the above aspects, the particle is at least partially coated with organic compound is selected from the group consisting of acrylic polymeric chains having carboxylic acid functional groups, hydroxy functional groups, and/or amine functional groups; polyamines such as polyethylene amine or polyethylene imine; poly(alkylene glycols) such as poly(ethylene glycol) and poly(propylene glycol), and polysaccharide chains.

According to an embodiment of any of the above aspects, the chemical functional group is at least partially further functionalized with an inorganic or organic compound so as to provide a combination of functional groups. The combination of chemical functional groups can be located on compounds selected from the group consisting of an antibody, a peptide of 2-200 amino acids, an amino acid, a polysaccharide, a sugar, a nucleotide or nucleoside including DNA or RNA, a $C_1$-$C_{30}$ alkyl, a $C_1$-$C_{30}$ alkenyl, a $C_1$-$C_{30}$ alkylyl, a $C_1$-$C_{30}$ ether, a $C_1$-$C_{30}$ amine, a $C_1$-$C_{30}$ ester, a $C_1$-$C_{30}$ amide, and combinations thereof.

According to an embodiment of any of the above aspects, the organic compound is selected from the group consisting of a polymer, such as a polysaccharide, an alginate, a chitosan, a PEG, a dextran or a polyethylene amine; and an organic acid.

According to an embodiment of any of the above aspects, the superparamagnetic or paramagnetic nanoparticles are super-paramagnetic or paramagnetic nanoparticles functionalised with a hydroxyl moiety.

According to an embodiment of any of the above aspects, the superparamagnetic or paramagnetic nanoparticles are made from iron, gold, silver, palladium, nickel or cobalt, or alloys thereof.

According to an embodiment of any of the above aspects, the superparamagnetic or paramagnetic nanoparticles are magnetite ($Fe_3O_4$) nanoparticles.

According to a further aspect the invention relates to a composition comprising crude oil and super-paramagnetic nanoparticles, said nanoparticles optionally comprising chemical functional groups.

According to yet a further aspect the invention relates to an oil with depleted sulphur content obtainable by a method according to any embodiment of the first, second and third aspects.

According to yet a further aspect the invention relates to a low viscosity oil obtainable by a method according to any embodiment of the first, second and third aspects.

According to yet a further aspect the invention relates to an oil with depleted content of aromatic compounds, such as any one of at least aromatic hydrocarbons and heteroatomic aromatic compounds and polynuclear aromatic compounds, obtainable by a method according to any embodiment of the first, second and third aspects.

According to yet a further aspect the invention relates to a crude oil fraction obtainable by a method according to any embodiment of the first, second and third aspects.

According to yet a further aspect, the invention relates to use of paramagnetic or super-paramagnetic nano-particles for removing aromatic hydrocarbons, heteroatomic aromatic compounds and/or polynuclear aromatic compounds from crude oil.

According to yet a further aspect, the invention relates to use of paramagnetic or super-paramagnetic nano-particles for providing an oil having a reduced amount/concentration of sulphur-containing aromatics.

The invention claimed is:

1. A method of treating crude oil in upstream refining processes comprising depleting the content of compounds selected from the group consisting of aromatic hydrocarbons and heteroatomic aromatic compounds and polynuclear aromatic compounds in said crude oil, said method comprising:
   i) contacting the crude oil with super-paramagnetic or paramagnetic nanoparticles comprising a super-paramagnetic or paramagnetic core being at least partially coated with an organic compound selected from the group consisting of: acrylic polymeric chains having one or more of carboxylic acid functional groups, hydroxy functional groups, and amine functional groups; polyamines; poly(alkylene glycols), and polysaccharide chains, wherein the super-paramagnetic or paramagnetic nanoparticles comprise chemical functional groups either originating from the super-paramagnetic or paramagnetic core or from a coating surrounding the core, and
   ii) removing the aromatic compound-nanoparticle complex from the crude oil so as to provide a crude oil with a depleted aromatic, heteroatomic aromatic, and polynuclear aromatic content.

2. The method according to claim 1 comprising:
   i) contacting the crude oil with super-paramagnetic or paramagnetic nanoparticles comprising chemical functional groups;
   ii) complexing at least a portion of the compounds selected from the group consisting of aromatic hydrocarbons and heteroatomic aromatic compounds and polynuclear aromatic compounds in said crude oil with the nanoparticle so as to form an aromatic compound-nanoparticle complex; and
   iii) removing the aromatic compound-nanoparticle complex from the crude oil by applying a magnetic field so as to provide a crude oil with a depleted aromatic, heteroatomic aromatic, and polynuclear aromatic content.

3. The method according to claim 1, wherein the diameter of the superparamagnetic or paramagnetic particles is between 1 nm to 10 μm.

4. The method according to claim 3, wherein the diameter of the superparamagnetic or paramagnetic nanoparticles is in the range of 1 to 1000 nm.

5. The method according to claim 1, wherein the particle size of the nanoparticles is in the range of 1 to 500 nm.

6. The method according to claim 5, wherein the particle size of the nanoparticles is in the range of 3 to 500 nm.

7. The method according to claim 6, wherein the particle size of the nanoparticles is in the range of 5 to 300 nm.

8. The method according to claim 7, wherein the particle size of the nanoparticles is in the range of 7.5 to 200 nm.

9. The method according to claim 8, wherein the particle size of the nanoparticles is in the range of 10 to 250 nm.

10. The method according to claim 9, wherein the particle size of the nanoparticles is in the range of 10 to 100 nm.

11. The method according claim 1 for depleting the crude oil in at least one of benzene, xylene, toluene, phenols; polycyclic aromatic hydrocarbons (PAHs), including naphthalene and 1,2-benzopyren; heteroatomic aromatics comprising nitrogen, sulfur and/or oxygen as a heteroatom in the ring structure, including thiophenes, benzothiophenes, and dibenzothiophenes; and asphaltene.

12. The method according to claim 1, wherein the chemical functional groups are selected from the group consisting of: carboxy, epoxy, ether, ketone, amine, hydroxy, alkoxy, alkyl, aryl, aralkyl, alkaryl, lactone, ionic groups, polymeric or oligomeric groups or a combination comprising at least one of the forgoing functional groups.

13. The method according to claim 12, wherein the chemical functional groups is selected from the group consisting of carboxylic acid groups.

14. The method according to claim 12, wherein the chemical functional groups is selected from the group consisting of ammonium groups and/or carboxylate salt groups.

15. The method according to claim 12, wherein the chemical functional groups are selected from the group consisting of a combination comprising at least one of the groups hydroxy, carboxylic acid, carboxylate ion or salt, amine or ammonium ion or salt.

16. The method according to claim 1, wherein the chemical functional group is at least partially further functionalized with an inorganic or organic compound so as to provide a combination of functional groups.

17. The method according to claim 1, wherein the superparamagnetic or paramagnetic nanoparticles are super-paramagnetic or paramagnetic nanoparticles functionalized with a hydroxy moiety.

18. The method according to claim 1, wherein the superparamagnetic or paramagnetic nanoparticles are made from iron, gold, silver, palladium, nickel or cobalt, or alloys thereof.

19. The method according to claim 1, wherein the superparamagnetic or paramagnetic nanoparticles are magnetite ($Fe_3O_4$) nanoparticles.

20. The method according to claim 1, wherein the nanoparticle is at least partially coated with an organic compound selected from the group consisting of polyethylene amine and polyethylene imine.

21. The method according to claim 1, wherein the nanoparticle is at least partially coated with an organic compound selected from the group consisting of poly(ethylene glycols) and poly(propylene glycols).

22. A method for processing crude oil, the method comprising:
providing paramagnetic or super-paramagnetic nanoparticles comprising a super-paramagnetic or paramagnetic core being at least partially coated with an organic compound selected from the group consisting of: acrylic polymeric chains having one or more of carboxylic acid functional groups, hydroxy functional groups, and amine functional groups; polyamines; poly(alkylene glycols), and polysaccharide chains, for removing aromatic hydrocarbons, heteroatomic aromatic compounds and/or polynuclear aromatic compounds from crude oil; and
contacting the crude oil with the paramagnetic or super-paramagnetic nanoparticles to thereby facilitate removal of aromatic, heteroatomic aromatic, and polynuclear aromatic content from the crude oil.

23. A method for processing crude oil, the method comprising:
providing paramagnetic or super-paramagnetic nanoparticles comprising a super-paramagnetic or paramagnetic core being at least partially coated with an organic compound selected from the group consisting of: acrylic polymeric chains having one or more of carboxylic acid functional groups, hydroxy functional groups, and amine functional groups; polyamines; poly(alkylene glycols), and polysaccharide chains;
contacting the crude oil with the paramagnetic or super-paramagnetic nano-particles to thereby provide oil having a reduced amount/concentration of sulphur-containing aromatics.

* * * * *